United States Patent [19]

Sulzberg

[11] 4,173,554

[45] Nov. 6, 1979

[54] AQUEOUS PRINTING INKS WITH IMPROVED TRANSFER PROPERTIES

[75] Inventor: Theodore Sulzberg, Highland Park, N.J.

[73] Assignee: Sun Chemical Corporation, New York, N.Y.

[21] Appl. No.: 923,152

[22] Filed: Jul. 10, 1978

[51] Int. Cl.$^2$ ............... C09D 11/06; C09D 11/08; C09D 11/10

[52] U.S. Cl. ............. 260/29.2 EP; 260/DIG. 38; 528/403; 525/4; 525/407

[58] Field of Search ............. 260/DIG. 38, 29.2 EP, 260/96.5 R, 96.5 C, 96.5 T, 18 EP, 27 R, 29.6 NR; 526/4; 528/403, 404

[56] References Cited

U.S. PATENT DOCUMENTS

| | | | |
|---|---|---|---|
| 2,520,715 | 8/1950 | Fetterly | 260/96.5 R |
| 2,644,759 | 7/1953 | Schroeder | 260/DIG. 38 |
| 2,982,742 | 5/1961 | Smith et al. | 528/404 |
| 3,298,980 | 1/1967 | Loudberg et al. | 528/404 |
| 3,692,548 | 9/1972 | Packer | 260/29.2 EP |
| 3,775,295 | 11/1973 | Franz et al. | 260/96.5 R |
| 4,014,833 | 3/1977 | Story | 260/DIG. 38 |

*Primary Examiner*—Allan Lieberman
*Attorney, Agent, or Firm*—Cynthia Berlow

[57] ABSTRACT

The transfer properties of aqueous printing inks are improved by including in the ink formulation a complex of a polyethylene oxide, a urea, and an alkali metal salt.

2 Claims, No Drawings

AQUEOUS PRINTING INKS WITH IMPROVED TRANSFER PROPERTIES

This invention relates to printing inks. More particularly it relates to aqueous printing inks having improved transfer properties.

BACKGROUND OF THE INVENTION

Among the criteria for an aqueous printing ink is its ability to be transferred from the inking roller to a wide variety of substrates, such as corrugated papers and cartons, plastic film, metal foils, newsprint, and so forth. The print should dry quickly; be strong, clear, sharp, resistant to rubbing and scuffing, and resistant to water; and possess high gloss.

It is known that the transfer properties of an aqueous printing ink can be improved by the addition thereto of polyethylene oxide. In U.S. Pat. No. 4,014,833, for example, ink compositions are claimed that contain 0.1–1.5 weight percent of polyethylene oxide having an average molecular weight between 100,000 and 350,000.

When, however, it was attempted to improve the transfer onto corrugated paper stock of a flexographic printing ink based on, e.g., a styrene-acrylic ester-acrylic acid terpolymer latex by adding thereto a polyethylene oxide, the results werer unsatisfactory for commercial use. With additions of about 0.1 to 0.5 weight percent of the polyethylene oxide, the ink transfer was poor, resulting in weak prints with low color intensity. Additions of about 1.0 to 1.5 weight percent of the polyethylene oxide greatly improved the transfer and the print strength was excellent; however, in a fast roll out there was considerable flying of the ink at the edges of the print, giving it a speckled appearance ("misting").

SUMMARY OF THE INVENTION

It has now been found that the addition to a flexographic ink of a modified polyethylene oxide resin system not only improves the ink transfer and thus the print strength, but also eliminates the objectionable flying and misting phenomena.

DETAILED DESCRIPTION OF THE INVENTION

The polyethylene oxide resins suitable for the present invention are generally nonionic homopolymers having average molecular weights between about 100,000 and 400,000. They are characterized by behaving like electron donors with a wide variety of electro acceptors, such as urea; thiourea; alkali metal salts, e.g., potassium chloride, potassium bromide, potassium oxalate, and potassium tartrate; poly(acrylic acid); phenolic resins; cellulosics; and the like.

Complexes are formed when the polyethylene oxide is reacted with one or more of these electron acceptors. The complexes may be prepared in any convenient manner, such as in solution, in the vapor phase, or in high shear apparatus, e.g., a two-roll mill. The temperature, pressure, and other reaction conditions vary, depending upon the selected components and the end-use application.

Although the mechanism by which the complexes are formed is not a critical feature of this invention, it is likely that, for example, two molecules of a urea complex with each oxyethylene unit in the polyethylene oxide; inclusion compounds with the polyethylene oxide may be formed with a potassium salt in a manner similar to the crown ethers which are macrocyclic ligands with strong affinities for the potassium cation.

While improved results are obtained with complexes of the polyethylene oxide with any one of the electron acceptors, it has been found that the incorporation in an aqueous printing ink formulation of a complex of a polyethylene oxide with a urea and an alkali metal salt results in a product that has excellent print strength and no flying or misting.

These complexes have the added advantage of permitting the use of decreased levels of the polyethylene oxide, excellent results being obtained with amounts within the range of about 0.8 to 2.0 parts or about 0.04 to 0.1 percent of a 5% solution in water of the polyethylene oxide, based on the total weight of the ink.

The amounts of the urea and the alkali metal salt are based on the amount of polyethylene oxide, the ratio of the amounts of 5% polyethylene oxide solution: alkali metal salt:urea being about 1:1–2:2–4. Thus the following parts are generally used:

|  | Polyethylene oxide | Alkali metal salt | Urea |
| --- | --- | --- | --- |
| minimum | 0.8 | 0.8–1.6 | 1.6–3.2 |
| maximum | 2.0 | 2.0–4.0 | 4.0–8.0 |

In general printing inks comprise a pigment and a vehicle made up of a varnish and a resin. While this invention will be described with printing inks wherein the resin is a terpolymer latex consisting of styrene, an acrylic ester, and an acrylic acid, it is not intended to be limited thereto, other resins being equally suitable. Examples of these include styrenated soya resin, polyacrylamide, poly(vinyl alcohol), and others known in the art.

The varnish may be any suitable material such as for example a maleic rosin solution or a styrenated shellac.

The colorant for the ink may be any conventional organic or inorganic pigment, e.g., molybdate orange, carbon black, titanium white, lithol rubine, benzidine yellow, phthalocyanine green, and phthalocyanine blue, as well as dyes in a conventional amount. For example, the vehicle may be used in an amount ranging from about 20 to 99.9 percent and the amount of colorant nay range from about 0.1 to 80 percent of the weight of the total composition.

Commonly known modifiers may be incorporated in the formulations using these resins, including plasticizers; wetting agents for the colorant; leveling agents, such as lanolin, paraffin waxes, and natural waxes; slip agents, such as low molecular weight polyethylenes, microcrystalline petroleum waxes, and silicone oils; and the like. Such modifiers are generally used in amounts ranging up to about 3 percent by weight, preferably about 1 percent, based on the total weight of the formulation. Other ingredients conventionally used in inks and coatings can be utilized to modify adhesion, toughness, and other key properties.

The formulations may be prepared in any convenient manner, such as for example in a three-roll mill, a sand mill, a ball mill, colloid mill, or the like, in accordance with known dispersion techniques.

The aqueous printing inks of this invention are suitable for printing a wide variety of substrates, such as paper, claycoated paper, corrugated cartons, newsprint, plastic film, and the like. The transfer properties and consequently the print strengths are excellent, and there is no flying or misting. In addition, the gloss and the wet rub resistance of the prints are superior to those of prints made with conventional inks.

The invention and its advantages will be better understood with reference to the following illustrative examples, but it is not intended to be limited thereto. In the examples, the parts are given by weight unless otherwise specified. The atmospheric and temperature conditions were ambient unless otherwise noted.

EXAMPLE I (A) An aqueous white flexographic ink was prepared by grinding in a ball mill the following ingredients:

|  | Parts |
|---|---|
| aqueous ink varnish (S.C. Johnson's acrylic resin Joncryl 85) | 26 |
| titanium dioxide | 40 |
| propylene glycol | 2 |
| surfactant | 2 |
| water | 5 |

After 8 hours of grinding in a ball mill, this white ink base was mixed with the following:

| | |
|---|---|
| 50% solids styrene terpolymer latex solution | 17.5 |
| polyethylene wax | 2.5 |
| water | 5 |
| polyethylene oxide (5% solution in water, molecular weight about 300,000) | 1.5 |
| urea | 2 |
| potassium chloride | 2 |

After these ingredients were mixed in a high-speed disperser for 30 minutes, sufficient water was added to reduce the viscosity to 20 seconds in a No. 2 Zahn cup. The ink was put on a flexographic press and run on corrugated cartons. The ink ran well, washed-up well, the print strength was excellent, and there was no misting or flying.

(B) A series of experiments was run to contrast the results of part (A) above with those wherein the additives are outside of the scope of this invention. In each run, the procedure and ingredients were identical to those of part (A) above except that the polyethylene oxide/urea/potassium chloride complex was omitted or substituted by each of the following:

| | Additive | Parts | Results |
|---|---|---|---|
| (1) | none | | weak print strength |
| (2) | polyethylene oxide | 0.5 | weak print strength |
| (3) | polyethylene oxide | 1.5 | good print strength, misting and flying |
| (4) | polyethylene oxide | 1.5 | weak print strength |

| | Additive | Parts | Results |
|---|---|---|---|
| | urea | 4 | |
| (5) | polyethylene oxide | 1.5 | very weak print strength |
| | potassium chloride | 4 | |

In each case the polyethylene oxide was used as a 5 percent solution in water.

EXAMPLE II

The procedure of Example I (A) was repeated except that the amounts of polyethylene oxide, potassium chloride, and urea were respectively, 0.8, 0.8, and 1.6 parts. The results were comparable.

EXAMPLE III

The procedure of Example I (A) was repeated except that the amounts of polyethylene oxide, potassium chloride, and urea were, respectively, 2.0, 4.0, and 8.0 parts. The results were comparable.

EXAMPLE IV

The procedures of Examples I (A), II, and III were repeated except that each of the following was used instead of potassium chloride: potassium bromide, potassium oxalate, and potassium tartrate. The results were comparable.

EXAMPLE V

The procedures of Examples I (A), II, and III were repeated except that each of the following was used instead of urea: thiourea, N,N'-dimethylurea, and a polyurea based on tolylene diisocyanate. The results were comparable.

EXAMPLE VI

The procedures of Examples I (A), II, and III were repeated except that each of the following pigments was used instead of titanium dioxide: carbon black, phthalocyanine blue, lithol rubine, and benzidine yellow. The results were comparable.

EXAMPLE VII

The procedures of Examples I (A), II, and III were repeated except that the polyethylene oxides had molecular weights of 100,00, 200,000, and 400,000. The results were comparable.

What is claimed is:

1. In an aqueous printing ink which comprises a pigment, a varnish, and a resin, the improvement which comprises incorporating in said ink about 0.8 to 2.0 parts by weight of a polyethylene oxide having an average molecular weight between about 100,000 and 400,000, about 0.8 to 4.0 parts by weight of a potassium salt, and about 1.6 to 8.0 parts by weight of a urea.

2. The ink of claim 1 wherein the ratio of the amount of a 5% aqueous polyethylene oxide solution: potassium salt:urea is about 1:1–2:2–4.

* * * * *